United States Patent

[11] 3,600,987

[72] Inventor Frank Kvasnicka
 Mt. Lebanon, Pa.
[21] Appl. No. 807,023
[22] Filed Mar. 13, 1969
[45] Patented Aug. 24, 1971
[73] Assignee Blaw-Knox Company
 Pittsburgh, Pa.

[54] APPARATUS FOR COMPENSATING FOR DEVIATIONS IN THE STRAIGHTNESS OF THE BED OF A MACHINE TOOL
5 Claims, 4 Drawing Figs.
[52] U.S. Cl............................................................ 82/1,
 AT, 82/32, 33/46
[51] Int. Cl............................................................. B23b 3/00
[50] Field of Search.......................................... 82/1, 2, 32;
 33/46.2 AT; 250/202, 203

[56] References Cited
UNITED STATES PATENTS

| 2,924,768 | 2/1960 | Farrand et al. | 250/203 X |
| 3,321,248 | 5/1967 | Williamson et al. | 299/1 |
| 3,498,673 | 3/1970 | Lerday et al. | 299/1 |

Primary Examiner—Francis S. Husar
Attorney—Busser, Smith & Harding

ABSTRACT: An apparatus for compensating for deviations in the straightness of the bed of a machine tool including a laser means providing the reference of straightness. A laser transmitter directs a laser beam which serves as the reference of straightness and a receiver is mounted on the carriage for movement therewith and is arranged to detect misalignment of the carriage from the reference of straightness and to provide an error signal which is received by a control means which moves a tool supporting means on the carriage to compensate for the bed deviation.

PATENTED AUG 24 1971 3,600,987

INVENTOR
FRANK KVASNICKA

BY
Frank A. Follmer
ATTORNEY

INVENTOR
FRANK KVASNICKA

APPARATUS FOR COMPENSATING FOR DEVIATIONS IN THE STRAIGHTNESS OF THE BED OF A MACHINE TOOL

BACKGROUND OF THE INVENTION

The invention relates to machine tool bed straightness compensating means and more particularly to an apparatus for compensating for deviations in the straightness of the bed of a machine tool such as a lathe.

In the construction of various machine tools, such as precision lathes, the straightness of the bed which guides the carriage is very important since any deviation from straightness in the bed is reproduced in the work piece. In the case of machine tools having very long beds, which may be up to a hundred feet in length, it is particularly difficult to construct a bed which is sufficiently straight for precision work. This is partly due to the fact that in the case of such lenghty beds, they are made of several sections that are machined, hand scraped and hand fitted together. It is not possible from a practical standpoint to make beds of this type sufficiently straight for precision work.

SUMMARY OF THE INVENTION

It is the general object of this invention to provide a highly accurate apparatus for compensating for deviations in the straightness of the bed of a machine tool. The apparatus in accordance with the invention is adapted for use in precision machine tools having long beds.

Briefly stated, the device in accordance with the invention comprises a laser means which includes a transmitter arranged to project a laser beam along the longitudinal axis of the machine tool so as to serve as a reference line of straightness. A laser beam receiver is mounted on the carriage to receive the laser beam and produces an error signal indicative of a deviation in the straightness of the bed. A control means receives this signal and actuates a portion of the carriage which controls the position of the tool carried by the carriage so as to compensate for this deviation of the bed.

DESCRIPTION OF THE PREFERRED EMBODIMENT

Figure 1:
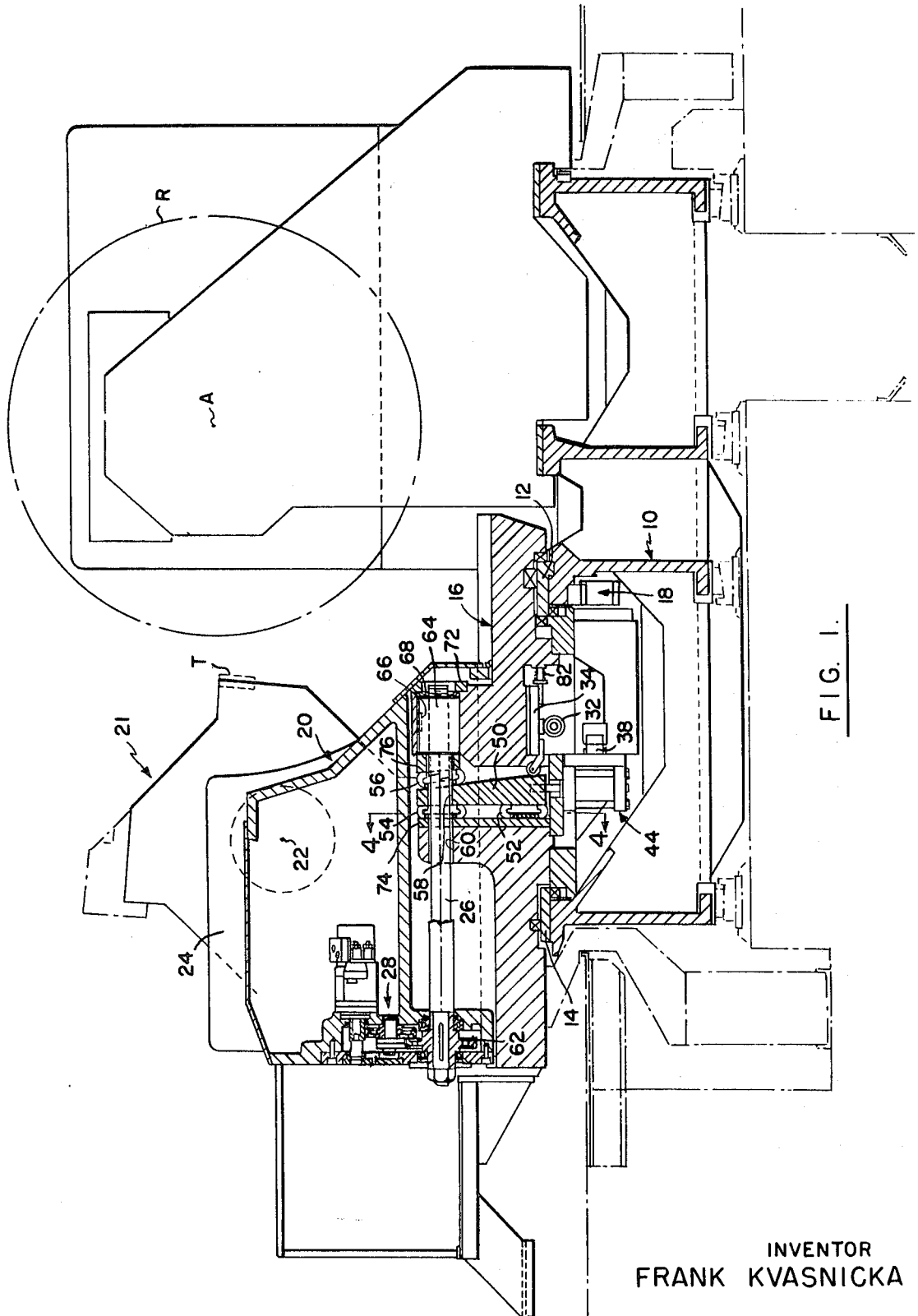
FIG. 1 is a transverse section through the carriage portion of a machine tool provided with the bed straightness compensating apparatus in accordance with the invention.

Referring to FIG. 1, the invention is shown as utilized in a typical precision roll lathe such as is used for the cutting of crowns on rolling mill rolls. The bed of such a lathe may be up to about a hundred feet long, the bed of the lathe shown being provided by a structure generally indicated at 10. The bed is supported on the floor in conventional fashion and is provided with a pair of longitudinally extending ways 12 and 14. The roll lathe shown is also provided with the usual headstock and tailstock for supporting a roll "R" shown in phantom. The longitudinal axis of the roll "R" and the supporting headstock and tailstock is indicated at "A."

The carriage of the lathe is indicated generally at 16 and is mounted for movement along the ways 12 and 14. The drive means for the carriage is indicated generally at 18 and comprises a rack-type drive as is conventional in the art.

A cross-slide 20 is mounted on the carriage in conventional fashion and carries a cutting tool means in the form of a turret 21 rotatable about an axis 22 and mounted on a tool post 24 carried by the cross-slide 20. The cross-slide 20 is mounted for transverse movement relative to the bed 10 and is provided with the usual crossfeed screw 26 which is driven by a conventional drive means 28. As is common, the crossfeed screw 26 extends transversely of the bed 10 and is rotated to produce a transverse movement of the cross-slide 20.

The lathe shown is of the type known in the art as a numerical controlled lathe involving a program control for controlling the operation of the cross-slide to impart the desired transverse movement of the tool during the cutting of a crown on the roll R. Various parts of the program control are shown in the drawings but form no part of the present invention.

The lathe mechanism described thus far is conventional in the art wherefore further detailed description thereof is not necessary.

In accordance with the invention, there is provided apparatus for compensating for deviations in the straightness of the bed. Such apparatus includes means providing a highly accurate reference of straightness in the form of a laser transmitter 30 (FIGS. 2 and 3) which is arranged to project a laser beam 31 parallel to the longitudinal axis of the machine tool and, of course, parallel to the desired longitudinal extent of the bed of the lathe as provided by the ways thereof. While various laser transmitters may be employed, one satisfactory type is the Model 5650 Autoreflecting Tooling Laser manufactured by the Perkin-Elmer Corporation. Because of the straightness of the line produced by a laser, it will be apparent that the reference of straightness provided in accordance with the invention will be highly accurate. Moreover, laser transmitters of the indicated type may be set up very accurately. For example, the above-mentioned laser transmitter emits a 10-mm.-diameter beam that is centered within one-thousandth of an inch relative to the outer diameter of the laser housing and is parallel to the mechanical axis of that housing within 10 arc seconds.

In accordance with the invention, a detector means is carried by the carriage 16 as it moves along the bed 10 to detect any deviation of the carriage from straightness of movement (which is caused by bed deviation) and provide a signal indicative of this deviation. Such means comprises a laser beam receiver or detector 32 which is mounted on the carriage 16 of the lathe and is arranged in alignment with the laser beam. One form of suitable device in the art is the Model CD-1 Centering Detector manufactured by the Perkin-Elmer Corporation. The detector of the indicated type consists of a target including an array of opposing detectors wired in a bridge circuit forming a sensor. A differential signal is generated by a pair of cells when the target is "out of line" relative to the laser beam, this signal taking the form of a voltage. Actually the detector senses the centroid of the energy of the laser beam and any offset between the centroid of the beam and the center of the detector can be utilized as an error signal and/or read out as linear displacement if a meter is provided.

It will be noted that the detector 32 is mounted on an antifriction slide 34 which is mounted on the carriage 16 for slideable movement transversely of the movement of the lathe for a purpose which will become apparent hereafter.

The signal produced by the detector 32 is transmitted to a servoamplifier 36 which amplifies the signal and transmits it to an electrically operated servo valve 38. The servo valve 38 controls the application of hydraulic pressure to a hydraulic actuator indicated at 40. The hydraulic actuator 40 comprises a manifold 42 and a cylinder 44, within which a piston 46 is moveable. The piston 46 carries an actuator rod 48 which extends upwardly from the cylinder 44. Mounted on the end of the actuator rod 48 is a vertically extending block 50 having a wedge-shaped or tapered configuration including a surface inclined at a slight angle (about 5°) relative to the vertical.

Figure 4:
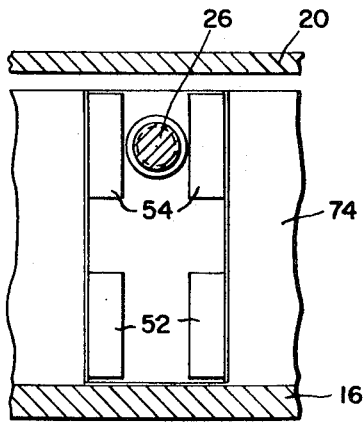
FIG. 4 is a fragmentary section of a detail taken on line 4—4 of FIG. 1.

The block 50 is mounted for movement on a vertical axis by three pairs of rolling bearings 52, 54 and 56. The arrangement of the bearings 52 and 54 is shown in FIG. 4.

The block 50 is provided with a horizontally extending bore 58 through which the crossfeed screw 26 extends. The feed screw 26 also extends through an aligned opening 60 in an upstanding portion of the carriage 16.

The crossfeed screw 26 carries at one end a gear 62 which serves as the drive for the screw. The other end of the screw 26 is threadedly engaged with a ball screw nut 64 which is contained in a cylindrical chamber formed in an upstanding portion of the carriage 16. The ball screw nut 64 is held against rotation by a key means indicated at 66. A washer-type spring 68 is positioned between the outer end of nut 64 and a shoulder which is formed by a cap member 72 secured to the carriage, whereby the spring 68 serves to bias the nut 64 toward the left as viewed in FIG. 1. The movement of the nut 64 to the left is limited by means of a plate 74 mounted on the carriage and various elements positioned between the plate 74 and the left end of the nut 64, namely, a collar 76, the rolling bearings 56, the upper end portion of the block 50, and the rolling bearings 54 which are arranged in the manner shown in FIG. 1. By this arrangement, it will be noted that the crossfeed screw 26 is mounted to permit axial movement transversely of the bed 10 of the lathe. Moreover, it will be apparent that this axial movement will be provided by the movement of the wedge-shaped block 50 between the rolling bearings 54 and 56 to increase or decrease the spacing between the bearings 54 and 56, the axial movement produced being accommodated by deflection of spring 68. Thus, the position of the block 50, which is controlled by a control means in accordance with the invention, will determine the position of the cross-slide, and ultimately the position of the cutting tool T of the turret 21 in contact with the work piece being cut. It will be apparent that this axial movement of the crossfeed screw 26 produced by the movement of the block 50 will be relatively small since the compensation necessary is small, although it is very important to achieve the accuracy necessary for precision work.

Means are provided for maintaining the target of the detector 32 in alignment with the laser beam as the carriage 16 is moved along the bed. To this end, a roller 80 is mounted on the left end of the slide 34 and a spring 82 is arranged to bias the slide 34 toward the left so that the roller 80 is biased into contact with the inclined surface of the block 50. By this arrangement, as the block 50 is moved vertically, the inclined surface causes lateral movement of the slide 34 and the target of the detector 32 in accordance with the position with the block 50, which, in turn, is positioned in response to the operation of the control means. Accordingly, the tool T and the detector 32 will be given the same compensating movement. Thus, if the mechanism maintains the detector target in alignment with the laser beam, there will be a corresponding positioning of the tool in alignment with the reference of straightness.

Figure 2:
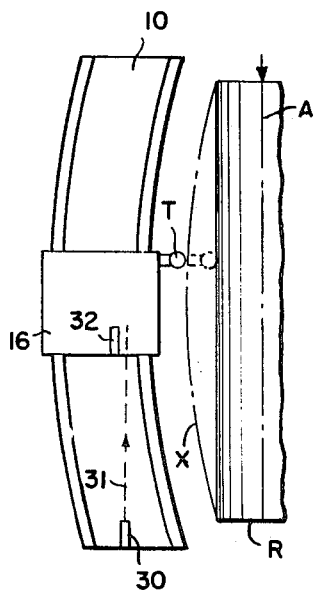
FIG. 2 is a schematic illustration of the operation of the apparatus in accordance with the invention.
Figure 3:
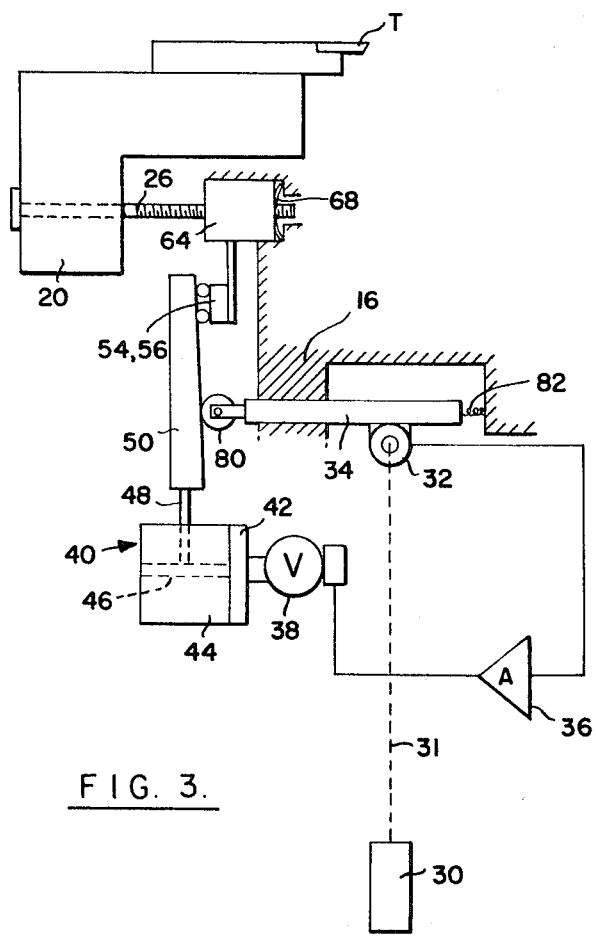
FIG. 3 is a schematic illustration of the control means in accordance with the invention.

To illustrate the operation of the apparatus in accordance with the invention, let it be assumed that the bed deviates from straightness in the manner illustrated in FIG. 2 wherein the deviation is obviously very exaggerated. Let it also be assumed that the lathe is cutting a straight cylindrical roll. As the carriage 16 moves along the bed 10, it will attempt to deviate from straightness in a direction away from the roll as is illustrated by line X in FIG. 3. As this deviation occurs, the target of the detector 32 will be moved "out of line" with the laser beam. When this occurs, the detector 32 provides an error signal which is indicative of the direction of the misalignment. This signal is transmitted to and amplified by the amplifier 36, which then transmits a control signal to the servo valve 38, which controls the application of hydraulic pressure to cause a movement of the block 50 which will effect a compensating movement of the ball screw nut 64 toward the work piece. This movement is transmitted to the crossfeed screw 26, and, of course, the cross-slide 20 which carries the tool T and a corresponding movement is imparted to the tool T. Thus, the tool T will actually move along a line parallel to the axis "A" of the roll R, this tool position being shown in dotted lines in FIG. 2.

The compensating movement of the block 50 is also imparted to the detector 32 by way of the slide 34 which follows the inclined surface of the block 50. The detector 32 will continue to issue an error signal as long as its target is out of alignment with the laser beam. However, once the detector target has returned into alignment with the laser beam this signal will be terminated. Thus, the compensating action of the control continues until the misalignment is fully corrected.

It will be apparent that the detector 32 and the tool T are both given a corresponding movement by virtue of the arrangement and construction of parts and thus as long as the detector 32 is maintained in alignment with the reference of straightness, the laser beam, there will be a like condition imparted to the tool T. Thus, by maintaining the laser beam detector 32 in alignment with the laser beam, the apparatus will also be maintaining the tool T, in alignment with the reference of straightness even though the bed will deviate from this reference of straightness. Accordingly, a compensating movement is provided.

It will be apparent that if the misalignment is in the direction opposite to that described above, an opposite signal will be produced by the detector which, in turn, will be transmitted to the block 50 to produce an opposite compensating movement of the tool T and the detector 32. It will also be apparent that any movement imparted to the cross-slide 20 by rotation of the crossfeed screw 26 will merely be superimposed upon the compensating movement provided by the antifriction wedge or block 50. For example, this would occur in the cutting of a crown on the lathe or even in a machine tool involving the cutting of threads or the like.

It will be noted that since the apparatus in accordance with the invention employs a highly accurate reference of straightness, i.e., a laser beam, highly accurate compensation for deviation in bed straightness may be achieved. Moreover, since the compensating action is achieved under actual cutting conditions, the end result will be very accurate.

It will be apparent that various changes may be made in the construction and arrangement of parts without imparting from the scope of the invention. For example, the compensating movement produced by the antifriction wedge need not be applied to the crossfeed screw of a cross-slide, but may, if desired, be applied to a cross-slide, or other tool supporting means, through another slide responsive to the movement produced by the hydraulic actuator.

Accordingly, it is not desired to be limited except as required by the following claims.

I claim:

1. In a machine tool having a longitudinally extending bed provided by at least one longitudinally extending way and a carriage movable along said bed and guided by said way, apparatus for compensating for deviations in the straightness of said way comprising a laser-type transmitter projecting a laser beam parallel to the longitudinal axis of the machine tool and the longitudinal extent of said way and providing a reference of straightness, a laser beam detector means movable with said carriage as it moves along said bed and arranged to receive said laser beam and to provide a signal indicative of deviations in the straightness of said bed from said reference of straightness, means on said carriage for carrying the working tool of said machine tool and for moving said tool laterally of said bed, control means receiving said signal from said detector and actuating said tool carrying means to move said tool in a direction and in an amount to compensate for the deviations in the straightness of the bed relative to said reference of straightness, said control means being mounted on said carriage and including a control member operatively connected to said tool carrying means and movable in accordance with said signal from said detector means to cause a compensating movement of said tool, means for movably mounting said detector means on said carriage and means movable by said control member for causing a movement of said detector means corresponding to the movement imparted to said tool so that said tool and said detector means are both given a corresponding movement, said tool carrying member comprising a cross-slide mounted on said carriage and adapted to provide a desired transverse movement to said tool in addition to said compensating movement by said control means, said cross-slide comprising a crossfeed screw for imparting transverse movement to said tool, said crossfeed screw extending transversely of said bed and being mounted for transverse movement, said control member being operatively connected to said crossfeed screw to impart a transverse movement thereto to achieve said compensating movement of said tool.

2. A combination according to claim 1 wherein said control member comprises a wedge-shaped block, and including means for moving said block along the tapered extent thereof, and means in contact with the tapered surface of said block for transmitting movement to said crossfeed screw.

3. The combination according to claim 2 wherein said detector moving means is arranged to be in contact with the tapered surface of said block.

4. In a machine tool having a longitudinal bed and a carriage movable along said bed and carrying a tool, apparatus for compensating for deviations in the straightness of said bed comprising laser means producing a laser beam which provides a reference of straightness parallel to the axis of said machine tool, means on said carriage for detecting deviations of said carriage from said reference of straightness as the carriage moves along said bed, and control means responsive to said detecting means for moving said tool to compensate for said deviations of said bed from said reference of straightness, said control means being mounted on said carriage, a cross-slide mounted on said carriage, said tool being carried by said cross-slide, a crossfeed screw, said cross-slide being movable transversely of said bed by said crossfeed screw, and means mounting said crossfeed screw for transverse movement, said compensating means being operatively connected to said crossfeed screw for providing said compensating movement by imparting transverse movement to said crossfeed screw.

5. The combination according to claim 4 wherein said control means includes means for moving said detecting means through a movement corresponding to the compensating movement imparted to said tool.